Feb. 13, 1923.
L. E. BENSON ET AL.
TRANSMITTING MECHANISM.
ORIGINAL FILED MAY 8, 1920.
1,445,474.
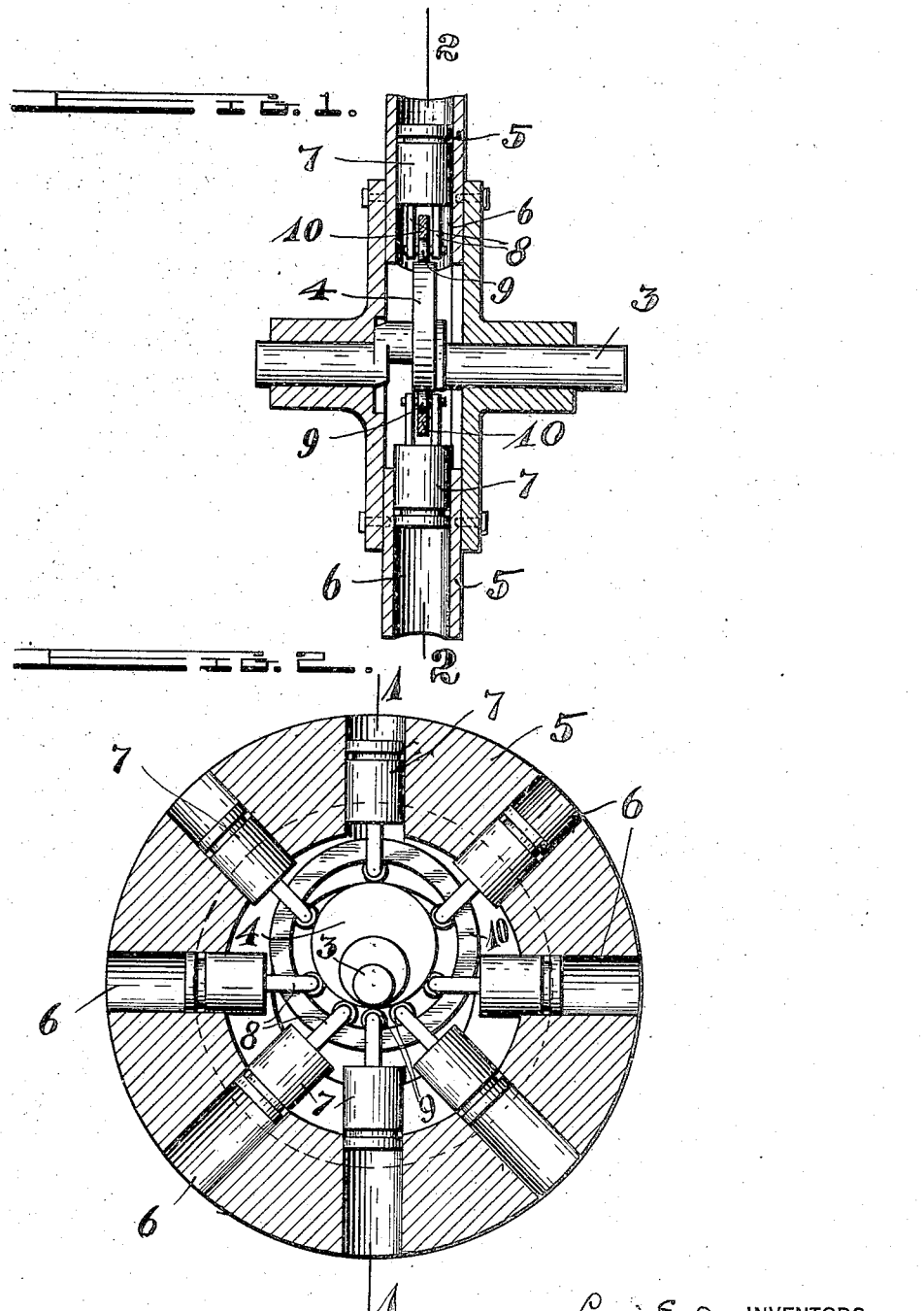
INVENTORS
Lewis E. Benson
Thomas Ray Rose
BY Vernon E. Hodges
their ATTORNEY Patented Feb. 13, 1923.

1,445,474

UNITED STATES PATENT OFFICE.

LEWIS E. BENSON, OF LOS ANGELES, AND THOMAS ROY ROSE, OF CALEXICO, CALIFORNIA.

TRANSMITTING MECHANISM.

Application filed May 8, 1920, Serial No. 380,014. Renewed October 9, 1922. Serial No. 593,439.

*To all whom it may concern:*

Be it known that we, LEWIS E. BENSON and THOMAS ROY ROSE, citizens of the United States, residing, respectively, at Los Angeles, in the county of Los Angeles, and State of Califorina, and at Calexico in the county of Imperial and State of California, have invented a new and useful Transmitting Mechanism, of which the following is a specification.

This invention relates to devices for transmitting the rotating movement of a shaft to the movements of pistons.

One of the objects of this invention is to provide a good power and motion transmitting means between a shaft and a piston.

Another object is to eliminate connecting rods between rotating shafts and reciprocating pistons.

Another object is to reduce the knocking between such rotating shafts and reciprocating pistons.

Another object is to provide a surer means for interconnecting rotating shafts and reciprocating pistons.

Other means will appear from the following description and appended claims as well as from the accompanying drawing, in which—

Fig. 1 is a longitudinal midsectional view of the device.

Fig. 2 is a cross section on line 2—2 of Fig. 1.

3 designates a shaft provided with a cam 4. The housing 5 is provided with a suitable number of bores 6 to form the cylinder bores of the device. A corresponding number of pistons 7 is disposed in such cylinders. The pistons 7 are provided with suitable projecting or extension ends 8. Near the terminations of such ends 8, rollers 9 are operatively disposed so as to come into rolling contact with the surface of the cam 4. A ring 10 of a size to form a space between the ring and the surface of the cam to allow the insertion of the several rollers 9 for holding such rollers suitably engaged for rolling on the surface of the cam during the full operation of the device is suitably disposed in naturally practically parallel relation to the surface of the cam 4. This construction makes it possible that the pistons can be operated without the usual pivoted connecting rods, the projecting or extension ends 8 being rigidly secured to or formed as a part of the pistons, as will easily be understood.

The cam 4 of the device causes naturally the movement of the several pistons in one direction while the ring 10 causes the same pistons to move in the opposite direction.

It will furthermore easily be understood that, either, the shaft or the cylinders and therewith the pistons can be made the rotating part of the device. This is to say that, if the shaft is to rotate, the housing (the cylinders 5, and therewith the pistons, to a certain extent) will form the stationary part of the device; while, if the shaft is made to be stationary in some manner, the housing 5 can be rotated around the shaft, to give the same results.

This device can naturally be used in connection with pumps, and various kinds of motors, as steam engines, explosive motors, and other similar devices.

Having thus described our invention, we claim:

1. In a transmission mechanism, a plurality of cylinders and pistons slidably mounted therein, prolongations or projecting ends on the pistons, anti-friction means mounted in said prolongations, a shaft, an endless rolling surface eccentric to said shaft, with which said means have anti-frictional contact and a free, independent and detachable ring mounted on said means concentric to said endless rolling surface and having a free anti-frictional contact with said means.

2. In a transmission mechanism, a plurality of cylinders and pistons slidably mounted therein, prolongations or projecting ends on the pistons, and rollers mounted in the ends thereof, a cam with which said rollers have rolling contact, and a free, independent and detachable ring mounted on said rollers concentrically with said cam, and having a free rolling contact with said rollers.

3. A transmission mechanism including a shaft, a plurality of cylinders and pistons radially disposed in respect of said shaft, an endless rolling surface eccentric to and carried by said shaft, a free, independent and floating ring concentric to said rolling surface and spaced therefrom, rollers interposed between the ring and said surface and having a free rolling contact with both, and means connecting the rollers and pistons.

In testimony that we claim the foregoing as our invention we have signed our names in the presence of two subscribing witnesses.

LEWIS E. BENSON.

Witnesses:
C. R. HARRIS,
BEN. O. L. WRIGHT.

THOMAS ROY ROSE.

Witnesses:
MAUDE W. GLASBY,
FRED H. SMITH.